United States Patent Office 2,767,612
Patented Oct. 23, 1956

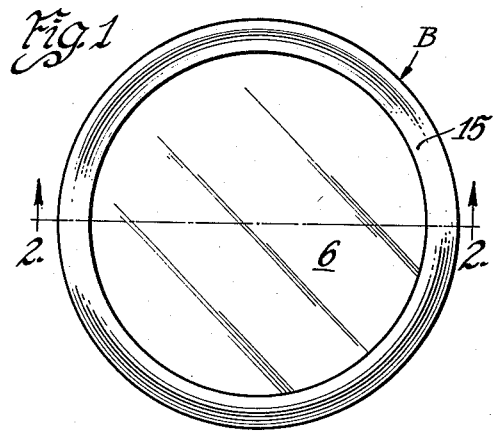
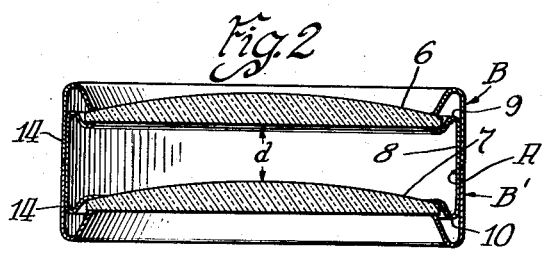
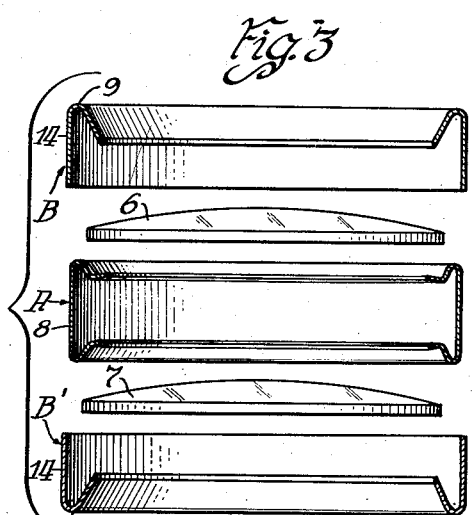
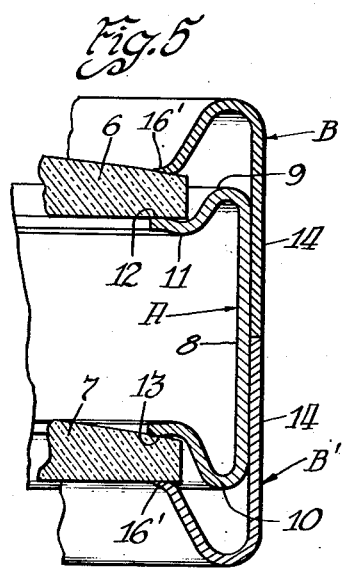
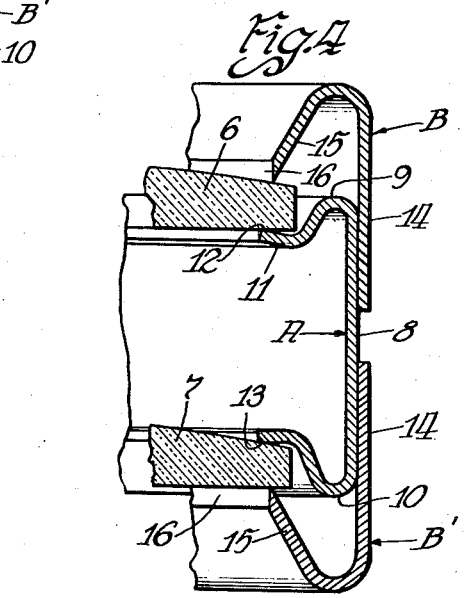

2,767,612

MOUNTING FOR LENSES AND THE LIKE

Hans A. W. Hofer, Chicago, Ill.; Lyda Ondratschek, executrix of the estate of said Hans A. W. Hofer, deceased Application September 19, 1951, Serial No. 247,305

12 Claims. (Cl. 88—39)

The invention relates to mounting devices especially useful in optical instruments and more particularly, to a construction and arrangement whereby objects such as lenses for optical use may be mounted and retained in a predetermined and precise optical relationship and in such manner that chance of damage to the lenses is minimized, the construction also being such as to preclude access of dirt, water and other foreign matter to lens surfaces which may be relatively inaccessible for cleaning. The invention will be illustrated and described in its application to a magnifier of particular type and employing a special double lens system, but it should be understood at the outset that the invention is not limited to such system and specific type of employment.

One of the principal objects of the invention, therefore, is to provide a lens mounting which, though simple and economical to manufacture, will secure a lens or lenses mounted therein in proper optical position and relationship and in such manner that the possibility of damage to the lens or lenses, as by dropping or striking the assembly, will be slight.

Another important object is to provide a lens mounting of such nature and construction that a tight and lasting seal is effected between the mounting and the lens or lenses carried thereby, to prevent the entry of dust, water, grease or other foreign matter between the lens and mounting or into the space between a pair of lenses mounted in series or tandem.

Many other objects as well as the advantages and uses of the invention will become appreciated after reading the following description and claims and after viewing the drawings in which:

Fig. 1 is a top plan view of a mounting for dual magnifying lenses, the mounting being constructed after the teaching of the invention hereof;

Fig. 2 is a diametric section of the magnifier mounting of Fig. 1, taken along the line 2—2 of Fig. 1;

Fig. 3 is an exploded view of the mounting and the lenses prior to their assembly into the structure illustrated in Figs. 1 and 2;

Fig. 4 is a view of a fragment of the magnifier shown in Figs. 1 and 2 taken on a diameter and shown on a much enlarged scale, the view illustrating the parts in the process of assembly; and Fig. 5 is a view corresponding to that of Fig. 4 illustrating the parts after the assembly has been completed.

Chosen for illustration is a magnifier employing a pair of plano-convex lenses designated 6 and 7 and which, for proper optical relationship, must be so mounted as to space them apart a correct optical distance $d$. Where lenses are employed in conjunction with one another, it becomes important either that they be so mounted as to permit ready access to their inner or adjacent surfaces for cleaning purposes or, as in the instant case, that the lenses be so mounted that dirt, water or other material which would destroy their optical usefulness, may not gain access to such inner surfaces. It is also of importance that the lenses be so mounted that should the assembly be dropped or struck, the lenses will be protected so far as possible against injury. The lens mounting, now to be described, not only serves these ends, but also fixes the proper focal distance $d$ between them.

The mounting illustrated consists of three (3) parts, a shell or inner member generally designated A and two (2) bezel ring or outer members generally designated B and B'. Preferably each of these mounting members A, B and B' is formed from sheet metal by stamping or other well known processes. While sheet aluminum, magnesium or alloys of these metals are preferred, sheet copper or alloys of copper such as bronze or brass and even sheet steel may be employed. However, whatever the material from which the members may be made, it should have such characteristics as will permit it to be employed for the functions and purposes herein described. Among other characteristics, the material should have reasonable ductility and resilience and a low coefficient of expansion or a coefficient of expansion reasonably close to the coefficient of expansion of the optical glass or other material of which the lenses or other objects to be held may be composed.

The inner shell or member A has a continuously extending side wall 8, of cylindrical shape in the embodiment illustrated, and inturned end portions 9 and 10, each in spaced relation to the side wall 8 as shown. Inturned end portion 9 which is designed to center and support lens 6, terminates in a perimetrically extending part 11 the terminal edge 12 of which preferably is formed to provide a perimetrically extending shallow lip directed outwardly and toward the axis of the shell member and the optical axis of the assembly. As later will be more clearly apparent, when the assembly is completed, the lip 12 will be deflected downward to provide a lens supporting seat extending perimetrically about and continuously contacting the marginal edge of the plano surface of the lens 6 at a slight distance inwardly from the perimeter of the lens. This arrangement also effects a tight seal between such lens surface and the seat 12 to prevent the entry of dirt, water or other substance between the lens and such seat. The inherent resilience of the sheet metal of which the shell or inner member is composed will permit this deflection and provides a "cushion" effect for any object such as a fragile lens.

The inturned end portion 10 also is so terminated as to provide a perimetrically extending seat 13 but here the seat may be curved only slightly or may be relatively flat since it is to contact with and conform to a portion of the convex surface of the lens 7, with a marginal edge portion of which it is to make tight sealing contact perimetrically thereabout. This seat 13, like seat 12, is resilient and serves as a cushion for the lens 7 with which it is normally in contact only over a narrow circular band. Initially and prior to the time that the assembly is completed the distance between the bottom surface of lens 6 and the top surface of lens 7, when measured along the axes of the lenses when the latter are in coaxial alignment and disposed upon their seats 12 and 13, will be greater than the distance $d$ by reason of the initial spacing of the seats 12 and 13. However, when the assembly is complete, the seats 12 and 13 will have been so deflected, through pressure exerted through the lenses by assembly of the members B and B', as to bring the lenses into juxtaposition with the proper distance $d$ between them. It is preferable that the contact between the lenses and the inner member occur only along the seats 12 and 13, as indicated in Figs. 4 and 5.

The bezel rings or outer members B and B' are formed alike so that either may be used at either end of the assembly. Each has a cylindrical side wall portion 14 and an inturned end portion 15 spaced from the side wall and terminating in a feather-edge 16, the dimensions of all of which portions are held within close limits for reasons which will be obvious or will become apparent. The feather-edges 16 are designed to make contact with the respectively adjacent marginal edge surfaces of the lenses 6 and 7 and to be deflected, or distorted (if the elastic limit of the material is exceeded), by contact with the lens surfaces as the outer or bezel ring members are assembled to the final position indicated in Figs. 2 and 5. The deflected feather-edges 16 are indicated at 16' in the view of Fig. 5 and engage the lens substantially opposite to the respective seats 12 and 13. This deflected feather-edge serves to effect a tight seal between the retainer rings or outer members and the adjacent surface of the adjacent lens and extend entirely about the perimeter of the lens. Special seals or sealing compounds between the metal and glass are unnecessary under any ordinary circumstances. Thus there is, in effect, a double seal between each lens and its mounting so that neither water, oil nor dirt may pass between the mounting parts and the lenses nor gain access to the inner faces of the lenses, the effect being substantially an hermetic seal. It will also be noted that when the assembly has been completed, as in Fig. 5, each lens is gripped between one of the deflected feather-edges and seat 12 or 13.

In order to obtain and maintain a relatively rigid and air-tight assembly more than an ordinary friction fit between the inner shell member and the outer or bezel ring members should be provided. To this end the outer diameter or transverse over-all dimensions of the inner member A should be somewhat greater than the corresponding inner diameter or dimensions of the outer or bezel ring members B and B', thereby to provide a force- or press-fit between the inner and outer members. Of course, it is desirable so to dimension the side walls 14, in a direction parallel to the axis of the assembly, that they just meet when the lenses are the correct distance d and the seats 11 and 13 are deflected accordingly and the feather-edge 16 are deflected or distorted into sealing engagement with the lens surfaces.

As an example of a very satisfactory construction, sheet aluminum of a gauge range of from 0.020" to 0.025", both limits inclusive, may be formed with suitable dies to provide the inner shell and the two (2) outer members, bezel rings or lens retainers for magnifier lenses of 3¾ diopters so cut that the lens rim will be 5/32 inch (0.156 inch) in thickness allowing a tolerance of ±0.010 inch for such thickness. The inner body shell should then have a diameter of 2.066 inch, O. D. and the bezel ring or outer members or lens retainers will have an internal side wall diameter, of 2.062 inch thereby to provide a press-fit size difference of 0.004 inch. The inturned ends of the inner and outer members, that is, the shell and the bezel ring members, are so proportioned as to provide a full 44 mm. opening for light transmission. Slightly thicker gauge aluminum such as 0.031 gauge should be employed when larger diameter lenses are employed, as for instance, for a lens of 3 diopters having a diameter of aproximately 3 inches. The construction of the mounting for a lense of 3¾ diopters should be such that when the assembly is complete, the distance d will be 0.245 inch.

Assuming that the lenses are themselves properly constructed and ground, the assembly produces a 4× magnifier giving excellent results both mechanically and optically. Injury to the lenses themselves as well as to the usefulness of the same as an optical device is minimized even under conditions of substantial abuse. The mounting provides a resilient but optically true support and positioning structure for the lenses and seals and protects the inner surfaces as described. The construction is not only efficient and effective for its purposes but is peculiarly economical because of its simplicity. The assembly lends itself to innumerable purposes and may be very quickly and easily mounted in various types of fixtures for relatively permanent location in any desired place. Of course, as indicated above, the mounting arrangement may be employed for mounting other objects such as plain or non-magnifying glass walls as in a specimen case.

While the invention has been disclosed in its preferred form and arrangement, it is susceptible of variation and modification without departing from the invention spirit or the scope of the appended claims.

I claim:

1. A mounting of the character described for fragile objects such as optical lenses comprising, an inner member composed of resilient sheet material such as aluminum, said inner member having a side wall to extend perimetrically of the object and a one-piece outer member of similar sheet material having a perimetrically extending side wall adapted, when assembled, to be telescoped over said side wall of the inner member with said side walls in frictional press-fit engagement with one another, each of said members at a corresponding end of each having an inwardly and rearwardly turned portion spaced from its said side wall and from the other, the inwardly turned portion of said inner member terminating in an inwardly directed and perimetrically extending seat for a perimeter margin of one side of the fragile object, the inwardly turned portion of said outer member terminating in an edge for engagement with a perimeter margin of the other side of the fragile object.

2. A mounting of the character described for fragile objects such as optical lenses comprising, an inner member composed of resilient sheet material such as aluminum, said inner member having a side wall extending perimetrically of the object and an outer member of similar sheet material having a perimetrically extending side wall telescoped over said side wall of the inner member with said side walls in frictional press-fit engagement with one another, each of said members at a corresponding end of each having an inwardly and rearwardly turned portion spaced from its said side wall and from the other, the inwardly turned portion of said inner member terminating in an inwardly directed and perimetrically extending seat for a perimeter margin of one side of the fragile object, the inwardly turned portion of said outer member terminating in a feather-edge for engagement with a perimeter margin of the other side of the fragile object.

3. A mounting of the character described for fragile objects such as a pair of optical lenses in an optical system comprising, an inner member composed of resilient sheet material such as aluminum, said inner member having a side wall extending perimetrically of the objects and a pair of outer members of similar sheet material each having a perimetrically extending side wall adapted, when assembled, to be telescoped over said side wall of the inner member from opposite ends of the latter with said side walls in frictional press-fit engagement with one another, each of the opposite ends of said inner member having a portion turned inward and toward the opposite end, each of said outer members having a correspondingly inturned end portion arranged to overlie one of the inturned end portions of said inner member and to be disposed in spaced relation thereto, each of the inturned portions of said inner member terminating in an inwardly directed and perimetrically extending seat portion for seating a perimeter margin of one side of one of the fragile objects, the inwardly turned portion of each of said outer members terminating in an edge for engagement with a perimeter margin of the other side of one of the fragile objects.

4. A mounting of the character described for fragile objects such as a pair of optical lenses in an optical system comprising, an inner member composed of resilient sheet material such as aluminum, said inner member having a side wall extending perimetrically of the objects and a pair of outer members of similar sheet material each having a perimetrically extending side wall adapted, when assembled, to be telescoped over said side wall of the inner member from opposite ends of the latter with said side walls in frictional press-fit engagement with one another, each of the opposite ends of said inner member having a portion turned inward and toward the opposite end, each of said outer members having a correspondingly inturned end portion arranged to overlie one of the inturned end portions of said inner member and to be disposed in spaced relation thereto, each of the inturned portions of said inner member terminating in a generally inwardly directed and perimetrically extending seat portion for seating a perimeter margin of one side of one of the fragile objects, one of said inner member seat portions having an outwardly directed terminal edge, the inwardly turned portion of each of said outer members terminating in a feather-edge for engagement with a perimeter margin of the other side of one of the fragile objects.

5. An optical lens and lens mounting comprising, a lens and inner and outer mounting members about the perimeter of the lens, said members having telescoped side walls in press-fit interengagement and an inwardly and reversely directed portion at a corresponding end of each, said portions being spaced from one another and from their respective side walls, the said portion of the inner member also having a terminal rim edge part in seating engagement with the margin of the inner surface of the lens, the said portion of the outer member having its terminal edge firmly compression stressed in direct engagement against the margin of the outer surface of the lens throughout the perimeter of the lens, said portions of said inner and outer members being stressed against the respectively adjacent lens surface to effect a substantially hermetic seal with such lens surface.

6. A lens and lens mounting comprising, a lens and inner and outer members composed of sheet metal such as aluminum, said members having telescoped side walls in press-fit inter-engagement and surrounding said lens, each of said members having an inwardly and reversely directed portion at a corresponding end of each, said portions being spaced from one another and from their respective side walls, the said portion of the outer member terminating in a feather-edge in distorted and substantially hermetically sealing engagement directly against the margin of the lens surface at one side of the lens, the said portion of the inner member terminating in a lens seat engaged with the margin of the opposite surface of the lens.

7. In an optical device wherein there are a pair of lenses arranged in predetermined optical relationship and a mounting for securing said lenses in said relationship, that construction and arrangement of mounting which comprises, a one-piece inner tubular shell of drawn metal such as aluminum, each end of said shell being turned inward and toward the opposite end in spaced relation to the shell side wall there-between and terminating in a seat for one of said pair of lenses, each of said seats extending perimetrically about the lens seated thereon, and a pair of tubular members of drawn metal such as aluminum for retaining said lenses, one retainer member being telescoped over one end of said shell and the other over the other end of said shell and each having frictional press-fit with the said shell side wall, each retainer member having its outer end turned inward the corresponding end of the other and into tight sealing engagement with the rim margin of the adjacent lens.

8. In an optical device wherein there are a pair of lenses arranged in predetermined optical relationship and a mounting for securing said lenses in said relationship, that construction and arrangement of mounting which comprises, a one-piece inner tubular shell of drawn metal such as aluminum, each end of said shell being turned inward and toward the opposite end in spaced relation to the shell side wall therebetween and terminating in a seat for one of the said pair of lenses, each of said seats extending perimetrically about the lens seated thereon, and a pair of tubular members of drawn metal such as aluminum for retaining said lenses, one retainer member being telescoped over one end of said shell and the other over the other end of said shell and each having frictional press-fit with the said shell side wall, each retainer member having its outer end turned inward toward the corresponding end of the other and terminating in a feather-edge, said feather-edge being distorted into tight sealing engagement with the rim margin of the adjacent lens.

9. In an optical device wherein there are a pair of plano-convex lenses arranged in the same plano-convex order and otherwise in predetermined optical relationship and a mounting for securing said lenses in said relationship, that construction and arrangement of mounting which comprises, a one-piece inner tubular shell of drawn metal such as aluminum, each end of said shell being turned inward and toward the opposite end in spaced relation to the shell side wall therebetween and terminating in a seat for one of said pair of lenses, each of said seats extending perimetrically about the lens seated thereon, one of said seats having an annular outwardly directed terminal edge for engaging the margin of the flat surface of one lens, and a pair of tubular members of drawn metal such as aluminum for retaining said lenses, one retainer member being telescoped over one end of said shell and the other over the other end of said shell and each having frictional press-fit with the said shell side wall, each retainer member having its outer end turned inward toward the corresponding end of the other and into tight sealing engagement with the rim margin of the adjacent lens.

10. In an optical device where there are a pair of plano-convex lenses arranged in the same plano-convex order and otherwise in predetermined optical relationship and a mounting for securing said lenses in said relationship, that construction and arrangement of mounting which comprises, a one-piece inner tubular shell of drawn metal such as aluminum, each end of said shell being turned inward and toward the opposite end in spaced relation to the shell side wall therebetween and terminating in a seat for one of said pair of lenses, each of said seats extending perimetrically about the lens seated thereon, one of said seats having an annular outwardly directed terminal edge for engaging the margin of the flat surface of one lens, and a pair of tubular members of drawn metal such as aluminum for retaining said lenses, one retainer member being telescoped over one end of said shell and the other over the other end of said shell and each having frictional press-fit with the said shell side wall, each retainer member having its outer end turned inward toward the corresponding end of the other and terminating in a feather-edge, said feather-edge being distorted into tight sealing engagement with the rim margin of the adjacent lens.

11. A reading glass comprising, in combination: two plano-convex lenses arranged co-axially and axially spaced apart; the plane faces of said lenses facing in the same direction; and a frame holding said lenses in place; said frame comprising: a first, inner annulus, having a cylindrical main portion of maximum diameter, torus-like portions integral with the ends of said main portion and curving inwardly and then axially back toward each other, and flange portions extending radially inward from said torus-like portions; a second, bottom outer annulus having a cylindrical main portion which is a press fit over a bottom fraction of said first annulus, a torus-like portion integral with the bottom end of said main portion and curving inwardly and then upwardly, and a flange portion extending radially inward from said torus-like portion; and a third, top outer annulus having a cylindrical main portion which is a press fit over a top fraction of said first annulus, a torus-like portion integral with the upper end of said main portion and curving inwardly and then downwardly; and a flange portion extending radially inward from said torus-like portion; said top and bottom torus-like portions extending axially beyond the lenses in both directions to provide mechanical shieldings; said four flanges engaging and completely supporting said lenses.

12. A mounting of the character described for a pair of spaced optical lenses in an optical system, comprising in combination with the lenses; an inner tubular annulus; two outer annuli telescoped over the ends of said inner annulus in frictional press-fit engagement therewith; the opposite ends of said inner annulus being curved first radially inward and then axially toward each other and then again radially inward into contact with and to define opposite seats for the adjacent marginal edges of said spaced lens members; the outer end of each of said outer annuli having a reversely-turned end portion curved radially inward and then diagonally inward and axially toward the other end; said reversely-turned outer end portions of the outer annuli having their ends axially spaced away from the adjacent seats of said inner annulus to receive, directly contact and grip the edges of said spaced lenses resting on said inner annulus seats; the lens-engaging portions of said mounting being in stressed condition resulting from deformation by axial telescoping movements of said outer annuli toward each other to assemble the parts in permanently-assembled hermetically-sealed relationship.

References Cited in the file of this patent
UNITED STATES PATENTS

| | | |
|---|---|---|
| 859,215 | Guilbert | July 9, 1907 |
| 1,053,512 | Huntoon et al. | Feb. 18, 1913 |
| 1,169,761 | Bausch | Feb. 1, 1916 |
| 1,687,818 | Wollensak | Oct. 16, 1928 |
| 2,083,600 | Gubisch | June 15, 1937 |
| 2,220,038 | Kreisler et al. | Oct. 29, 1940 |
| 2,373,610 | Stegemann | Apr. 10, 1945 |